United States Patent
Kodama et al.

(10) Patent No.: US 8,502,939 B2
(45) Date of Patent: Aug. 6, 2013

(54) OPTICAL SHEET

(75) Inventors: Takashi Kodama, Tokyo (JP); Gen Furui, Tokyo (JP); Makoto Honda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 190 days.

(21) Appl. No.: 13/123,786

(22) PCT Filed: Nov. 9, 2009

(86) PCT No.: PCT/JP2009/069034
§ 371 (c)(1),
(2), (4) Date: Apr. 12, 2011

(87) PCT Pub. No.: WO2010/055814
PCT Pub. Date: May 20, 2010

(65) Prior Publication Data
US 2011/0194055 A1    Aug. 11, 2011

(30) Foreign Application Priority Data

Nov. 11, 2008 (JP) .................... 2008-288872
Nov. 11, 2008 (JP) .................... 2008-288875

(51) Int. Cl.
*G02F 1/1335* (2006.01)
(52) U.S. Cl.
USPC .......................................................... 349/96
(58) Field of Classification Search
USPC .......................................................... 349/96
See application file for complete search history.

(56) References Cited

U.S. PATENT DOCUMENTS

| | | | |
|---|---|---|---|
| 2007/0048458 A1 | 3/2007 | Haruta et al. |
| 2007/0268587 A1 | 11/2007 | Ninomiya et al. |

FOREIGN PATENT DOCUMENTS

| | | |
|---|---|---|
| JP | 2002-267818 | 9/2002 |
| JP | 2007-17626 | 1/2007 |
| JP | 2007-334294 | 12/2007 |

OTHER PUBLICATIONS

International Search Report issued Mar. 23, 2010 in International (PCT) Application No. PCT/JP2009/069034.
International Preliminary Report on Patentability issued Jun. 30, 2011 in International (PCT) Application No. PCT/JP2009/069034.

*Primary Examiner* — Phu Vu
(74) *Attorney, Agent, or Firm* — Wenderoth, Lind & Ponack, L.L.P.

(57) ABSTRACT

There is provided an optical sheet for use as a display device surface, which has a functional layer on at least one side of a base material and has a diffusion factor on the outer surface and/or interior of the functional layer, wherein the relationship represented by the following formula (I) is satisfied.

$$0.16 < S \times \beta < 0.70 \qquad (I)$$

S: Diffuse regular reflection intensity/regular reflection intensity of base material
β: The diffusion angle exhibiting ⅓ of the diffusion intensity, obtained by extrapolating a straight line connecting the reflection intensity for diffuse regular reflection intensity at ±2 degrees and the reflection intensity for diffuse regular reflection at ±1 degree, to the diffuse regular reflection angle.

16 Claims, 10 Drawing Sheets

OPTICAL SHEET

TECHNICAL FIELD

The present invention relates to an optical sheet with excellent contrast.

BACKGROUND ART

Optical sheets used for display device surfaces have layers with functions such as an anti-glare property, antistatic property and antifouling property laminated as functional layers on the observer side of a base material. To exhibit these functions, for example, in order to impart an anti-glare property, methods of forming an irregular shape in the surface layer or adding diffusion particles to the resin forming the surface layer are employed. Conductive fine particles or a conductive resin may be added to impart an antistatic property, or a fluorine-containing polymer or stain-proofing agent may be added in order to impart an antifouling property. Since such diffusion particles, conductive fine particles and additives are not completely phase-soluble with surface layer-forming resins, an optical sheet that employs them has a function of diffusing visible light. The irregular sections of the surface layer also have the function of diffusing visible light.

In addition, irregularities larger than the visible light wavelength are formed in the surface layer, the base material back side and between each layer in order to prevent interference patterns between optical sheets and interference patterns between optical sheets and display devices, and such irregularities also have the function of diffusing visible light.

According to the invention, such causes of visible light diffusion are defined as "diffusion factors", and the presence of such diffusion factors causes the optical sheet to have reduced contrast due to reflection of external light. In other words, an optical sheet should maintain the function of the optical sheet while preventing loss of contrast.

The haze value, or the ratio of the interior haze and total haze, is commonly used as a simple method for evaluating contrast. Specifically, it has been considered that an optical sheet with low contrast reduction can be produced by specifying the materials and controlling the production conditions in the optical sheet production process for a lower haze value (see Japanese Unexamined Patent Application Publication No. 2002-267818, Japanese Unexamined Patent Application Publication No. 2007-334294 and Japanese Unexamined Patent Application Publication No. 2007-17626).

CITATION LIST

Patent Literature

SUMMARY OF THE INVENTION

However, contrast often differs even with the same haze value, and it has been found that, with production using the haze value and the ratio of the interior haze and total haze as indexes, for example, it is not always possible to stably produce a satisfactory optical sheet.

In light of these circumstances, it is an object of the present invention to provide an optical sheet with satisfactory contrast.

Contrast has hitherto been considered to depend on surface form, which includes the Ra, Rz, Sm and θa values for surface irregularities, or has been considered to depend on the state of reflection of external light that is based on the difference in refractive index between the interior dispersing agent and binder resin, or interior diffusion particles. In other words, the effect of interaction between surface irregularities and internal diffusion factors has not been considered.

The present inventors have found that the diffusion properties for light passing through and light reflected by diffusion particles from among projected light and external light incident to the diffusion particles, differs significantly depending on the difference in refractive index between the interior diffusion particles and binder resin, as indicated by 1 to 4 in FIG. 10, and that a larger difference in refractive index between the diffusion particles and binder increases the reflected light quantity by the diffusion particles and increases the diffusion angle, thus increasing the stray light quantity from projected light and the reflected light quantity from external light and lowering the contrast, and have further found that for projected light as well, the transmission and reflectance properties for projected light passing through the diffusion particles, and the state of stray light generation which impairs resolution and contrast, differ significantly depending on the positional relationship between the diffusion particles and surface irregularities, as indicated by 1-1 to 1-5 in FIG. 9-1, and that for external light as well, the state of stray light generation which impairs the reflectance properties and contrast for reflected light by the diffusion particles from external light incident to the diffusion layer interior, differ significantly depending on the positional relationship between the diffusion particles and surface irregularities, as indicated by 2-1 to 2-4 in FIG. 9-2, so that by combining the surface irregularity shape, the diffusion particle properties and the relationship between surface irregularities and interior diffusion particles according to the optical sheet of the present application, it is possible to obtain an optical sheet with excellent contrast.

Also, when the positional relationship between the surface irregularities and diffusion particles is such that the diffusion of external light reflected by the diffusion particles is large, as shown by the diffusion particles 2-2 in FIG. 9-2, the diffusion of projected light is also large tending to produce stray light, as indicated by 1-2 in FIG. 9-1, thus also tending to result in contrast reduction due to the projected light. That is, the magnitude relationship for contrast reduction by stray light from projected light can be considered to approximate the reflectance properties for external light.

Contrast has hitherto been considered to depend on the haze value. The haze value, according to JIS K7136:2000 and ISO 14782:1999, is defined as "the percentage of transmitted light of at least 0.044 rad (2.5°) from an incident beam by forward scattering, of the transmitted light passing through a test piece". That is, the haze value represents the percentage of scattered light being scattered at least ±2.5° from an incident light beam, and it completely ignores the luminance distribution by diffusion. In terms of extreme examples, optical sheets with total mirror reflection (absolutely no diffusion) and optical sheets with no mirror reflection but with all of the transmitted light diffused within ±2.5°, have haze values of 0.

On the other hand, for example, an optical sheet wherein the light quantity within ±2.5° of the transmitted light is 30% and the transmitted light scatters at an angle of 70-80°, and an optical sheet wherein the light quantity within ±2.5° of the transmitted light is similarly 30% and the transmitted light scatters at an angle of 5-10°, both have haze values of 70%.

FIG. 1 shows the relationship between haze value and contrast, and FIG. 2 shows the relationship between interior haze and total haze ratio and contrast, as results verified for optical sheets fabricated under different conditions. As shown in FIG. 1 and FIG. 2, optical sheets may have completely different contrast as evaluated by an observer, even if they have the same haze value and ratio between interior haze and total haze. The contrast referred to here is light-room contrast.

As a result of much diligent research based on this knowledge, the present inventors have found that it is possible to conveniently evaluate contrast that has not been evaluable with the conventional haze value, by incorporating the concept of intensity distribution due to diffusion. More specifically, it was found that contrast can be conveniently evaluated by using as the index the product of the value S as the diffuse regular reflection intensity of an optical sheet divided by the regular reflection intensity of a base material with no diffusion factor composing the optical sheet, and the diffusion angle β that exhibits ⅓ of the diffusion intensity obtained by extrapolation of a straight line connecting the reflection intensity for diffuse regular reflection intensity at ±2° and the reflection intensity for diffuse regular reflection at ±1°, to the diffuse regular reflection angle, and that an optical sheet with minimal reduction in contrast can be efficiently and stably produced by using the above as an index to control the material selection and production conditions in the process of producing the optical sheet.

The present invention has been completed based on the knowledge described above, and it encompasses the following modes.

(1) An optical sheet for use as a display device surface, which has a functional layer on at least one side of a base material and has a diffusion factor on the outer surface and/or interior of the functional layer, wherein the relationship represented by the following formula (I) is satisfied.

$$0.16 < S \times \beta < 0.70 \quad (I)$$

S: Diffuse regular reflection intensity/regular reflection intensity of base material β: The diffusion angle exhibiting ⅓ of the diffusion intensity, obtained by extrapolating a straight line connecting the reflection intensity for diffuse regular reflection intensity at ±2° and the reflection intensity for diffuse regular reflection at ±1°, to the diffuse regular reflection angle.

(2) An optical sheet according to (1) above, wherein the following formula (II) is satisfied.

$$0.26 < S \times \beta < 0.70 \quad (II)$$

(3) An optical sheet according to (1) above, wherein the following formula (III) is satisfied.

$$0.46 < S \times \beta < 0.70 \quad (III)$$

(4) An optical sheet according to any one of (1) to (3) above, wherein the display device is a liquid crystal display unit.

(5) An optical sheet according to any one of (1) to (4) above, wherein the functional layer comprises translucent inorganic particles and/or translucent organic particles dispersed in a transparent resin.

(6) An optical sheet according to any one of (1) to (5) above, wherein the functional layer is a transparent resin, and the transparent resin is composed of a plurality of phase separable resins.

(7) An optical sheet according to (5) or (6) above, wherein the refractive indexes of the transparent resin and the translucent inorganic particles and/or translucent organic particles differ.

(8) An optical sheet according to any one of (5) to (7) above, wherein irregularities are produced in the surface of the functional layer by the translucent inorganic particles and/or translucent organic particles.

(9) An optical sheet according to any one of (5) to (8) above, wherein the difference in the refractive indexes of the transparent resin and the translucent inorganic particles and/or translucent organic particles is 0.01-0.25.

(10) An optical sheet according to any one of (5) to (9) above, wherein the mean particle size of the translucent inorganic particles and/or translucent organic particles is 0.5-20 μm.

(11) An optical sheet according to any one of (5) to (10) above, wherein (d75-d25)/MV is no greater than 0.25, where MV is the mean diameter based on the weight average of the translucent inorganic particles and/or translucent organic particles, d25 is the cumulative 25% diameter and d75 is the cumulative 75% diameter.

(12) An optical sheet according to any one of (5) to (11) above, wherein the translucent inorganic particles and/or translucent organic particles are present at 1-30 wt % in the transparent resin.

(13) An optical sheet according to any one of (1) to (12) above, wherein the irregularities formed in a die surface are transferred by inversion to form irregularities in the surface of the functional layer.

(14) An optical sheet according to any one of (5) to (11) above, wherein the transparent resin is an ionizing radiation curable resin, and the functional layer is formed by coating an ionizing radiation curable resin composition containing the ionizing radiation curable resin onto a transparent base material and subjecting it to crosslinking curing.

(15) An optical sheet according to (14) above, wherein the transparent base material is composed of a cellulose-based resin, the ionizing radiation curable resin composition comprises a solvent that is to be impregnated into the transparent base material and/or an ionizing radiation curable resin that is to be impregnated into the transparent base material and a solvent that is not to be impregnated into the transparent base material and/or an ionizing radiation curable resin that is not to be impregnated into the transparent base material, and the degree of impregnation into the transparent base material is adjusted for control so that the relationship of formula (I), formula (II) or formula (III) is satisfied.

(16) An optical sheet according to any one of (1) to (15) above, wherein the transparent base material is triacetylcellulose or a cyclic polyolefin.

(17) An optical sheet according to any one of (1) to (15) above, wherein the transparent base material is polyethylene terephthalate.

(18) An optical sheet according to any one of (1) to (17) above, wherein the functional layer comprises a hard coat layer, and the steel wool scuff resistance is at least 200 g/cm$^2$.

(19) An optical sheet according to any one of (1) to (18) above, which has an anti-reflection functional layer formed on the uppermost surface layer.

(20) A polarizing plate employing an optical sheet according to any one of (1) to (19) above.

(21) An image display device employing a polarizing plate according to (20) above.

(22) A method for producing an optical sheet for use as a display device surface, which has a functional layer on at least one side of a transparent base material and has a diffusion factor on the outer surface and/or interior of the functional layer, wherein the production conditions are controlled so that the relationships of formula (I) to formula (III) are satisfied.

According to the invention it is possible to provide an optical sheet which allows convenient evaluation of contrast that has not been evaluable by the conventional haze value, and low reduction in contrast.

DETAILED DESCRIPTION OF THE INVENTION

The optical sheet of the invention has a functional layer on at least one side of a base material and has a diffusion factor on the outer surface and/or interior of the functional layer, wherein the relationship $0.16 < S \times \beta < 0.70$ is satisfied.

The method of calculating S and $\beta$ will now be explained with reference to FIGS. 3 and 4.

(Method of Calculating S)

S is defined as the value of the diffuse regular reflection intensity of the optical sheet divided by the regular reflection intensity of the base material which composes the optical sheet and has no diffusion factor (diffuse regular reflection intensity/regular reflection intensity of base material).

Figure 3:
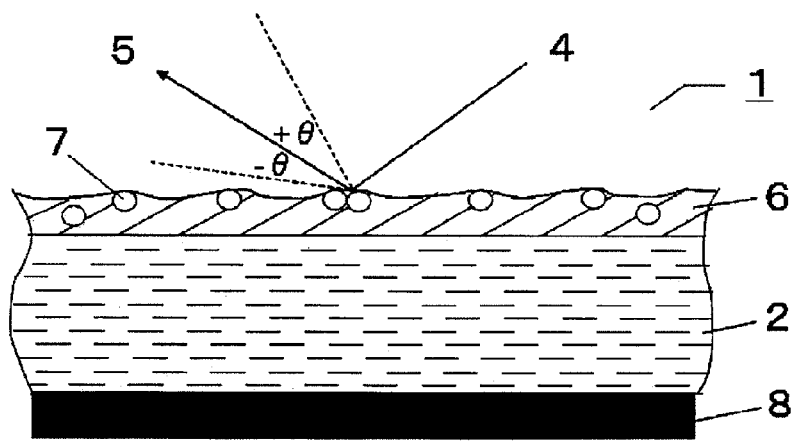
FIG. 3 is a conceptual drawing showing the method of measuring diffuse reflection intensity according to the invention.

When visible light rays are irradiated from direction 4 onto the optical sheet 1 as shown in FIG. 3, diffuse regular reflection occurs in direction 5, while part of the light is diffused. The direction of 5 is the diffuse regular reflection direction, and the intensity of light in the diffuse regular reflection direction is defined as the diffuse regular reflection intensity. As explained below, a visible light ray-absorbing material 8 such as a black acrylic board is attached to the back side of the base material 2 via an adhesive, in order to suppress back side reflection to match conditions of practical use.

In FIG. 3, the direction of 5 is the regular reflection direction when measurement is conducted using a base material 2 having no diffusion factor instead of the optical sheet 1, and the intensity of light in the regular reflection direction is defined as the regular reflection intensity of the base material.

For a base material having irregularities on the surface, a transparent resin with a difference in refractive index of less than 0.02 from the base material is coated onto the irregular surface and planarized, and this is measured as the base material.

(Method of Calculating $\beta$)

When visible light rays are irradiated from direction 4 onto the optical sheet 1 as shown in FIG. 3, diffuse regular reflection occurs in direction 5, while part of the light is diffused. According to the invention, the reflection intensity R2 in the direction $\pm 2°$ with respect to the diffuse regular reflection direction (where $\theta$ 2° in FIG. 3) and the reflection intensity R1 in the direction $\pm 1°$ with respect to the diffuse regular reflection direction (where $\theta$ is 1° in FIG. 3) are both measured, and $\beta$ is defined as the diffusion angle exhibiting 1/3 of the diffusion intensity extrapolated from a straight line connecting R2 and R1 to the diffuse regular reflection angle (hereinafter referred to as "virtual regular reflection diffusion intensity") (see FIG. 4). As explained below, a visible light ray-absorbing material 8 such as a black acrylic board is attached to the back side of the base material 2 via an adhesive, in order to suppress back side reflection to match conditions of practical use.

By controlling the material selection and production conditions in the optical sheet production process, using $S \times \beta$ as the index, it is possible to accomplish efficient production of an optical sheet that exhibits the function of a functional layer while also having low reduction in contrast.

Specifically, the diffuse reflection intensity is measured in the following manner.

(Method of Measuring Diffuse Reflection Intensity)

The back side of an optical sheet (the side without the surface layer, or the side opposite the observer side) is attached via a transparent pressure-sensitive adhesive to a flat black acrylic board without irregularities or warping, to fabricate an evaluation sample. The black acrylic board used here is to prevent back side reflection as described above, and it is not particularly restricted so long as no air layer is present on the back side of the optical sheet, and visible light can be absorbed. When measurement is in the manufacturing line, for example, it is possible to perform online measurement by a method such as coating a black paint onto the back side of the examining section of the optical sheet.

Next, the evaluation sample is set in a measuring apparatus and a light beam is directed at an angle 45° from the normal to the surface of the optical sheet side of the evaluation sample. The diffuse reflection intensity is measured in a specific range with respect to light from a light beam impinging on the optical sheet surface of an evaluation sample and diffuse reflected, such as for example, in a range of −85° to 85° with respect to the direction normal to the surface of the optical sheet 1. Within this range, the reflection intensity in the direction $\pm 1°$ with respect to the direction of diffuse regular reflection and the reflection intensity in the direction $\pm 2°$ with respect to the direction of diffuse regular reflection, are used to calculate the virtual regular reflection diffusion intensity, as explained above. In the case of low diffusion, the measurement range can be narrowed to an extent that does not significantly affect the results for the diffuse reflection intensity, in order to shorten the time. The apparatus used to measure the diffuse reflection intensity is not particularly restricted, but a GC5000L by Nippon Denshoku Industries Co., Ltd. was used for the invention.

The reason that $S \times \beta$ determines the quality of contrast in an optical sheet will now be explained. In an optical sheet, since the crests of irregularities are dispersed and/or the diffusion particles are sparsely distributed in the interior in planar areas, the reflection diffusion property is a synthesis of external light that does not impact with diffusion factors and is "through-light", and light that impacts with diffusion factors. Hence, the synthesis of sections having reflection intensity only in the regular reflection direction and sections having smooth reflection intensity constitutes the reflectance property for original regular reflection as shown in FIG. 4. On the other hand, contrast is determined by the diffusion property of light impacting the diffusion factors, and therefore the diffusion property for light impacting the diffusion factors must be known. That is, the reflectance property for ideal regular reflection in FIG. 4 approximates the regular reflection of light impacting the diffusion factors.

Figure 4:
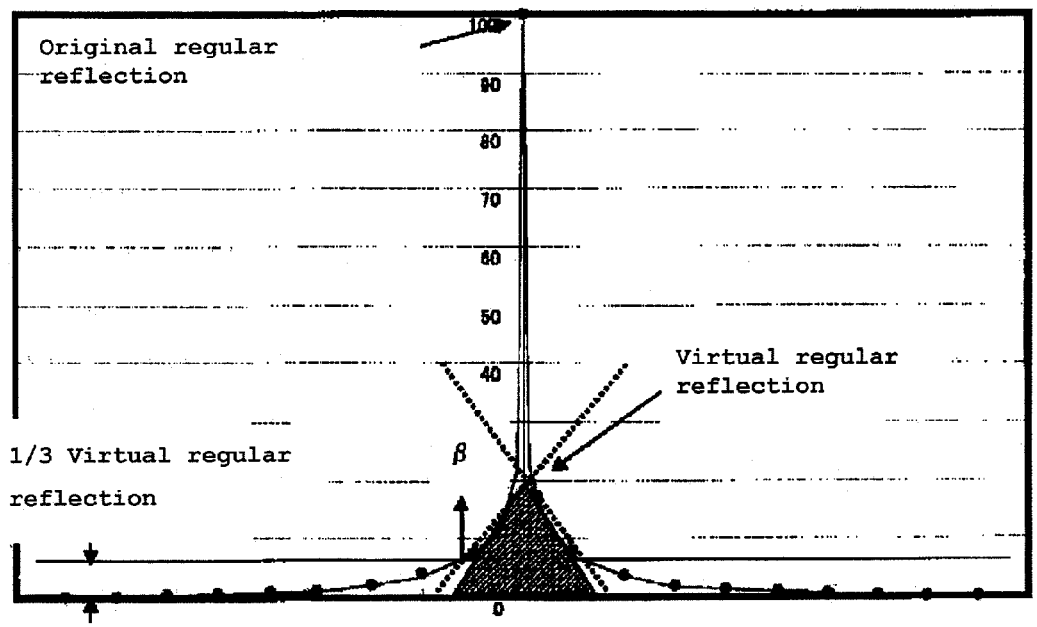
FIG. 4 is a graph illustrating a method of calculating $\beta$.

Here, S×β represents the triangular area of the diagonally shaded section in FIG. 4. Specifically, it approximates the area defined by the curve representing the relationship of intensity with respect to diffusion angle, near the regular reflection of light impacting the diffusion factors. The reason for using the diffusion angle and intensity near regular reflection for the state of diffusion due to diffusion factors that affect contrast, is that the change in intensity depending on diffusion angle due to the diffusion factors is highly prominent near regular reflection. Thus, S×β represents the state of the diffusion angle and intensity due to diffusion factors near regular reflection, and it is therefore inferred to be equivalent to the diffusion performance of the diffusion factors. Furthermore, the fact that S×β has a suitable value, in terms of the surface form (external diffusion factor), is related to the irregularity slope angle and the percentage of irregularities, while in terms of internal diffusion it is related to the difference in refractive indexes of the diffusion particles and binder, the probability of collision with diffusion particles and the shape, and in terms of interaction between the surface form and internal diffusion it is related to how much further the interaction is weakened or strengthened, so that it determines the quality of contrast.

The optical sheet of the invention satisfies the following formula (I).

$$0.16 < S \times \beta < 0.70 \qquad (I)$$

When S×β is greater than 0.16, it is possible to obtain an optical sheet with low reduction in contrast. From the viewpoint of limiting reduction in contrast, S×β is preferably greater than 0.26 (0.26<S×β), and more preferably greater than 0.46 (0.46<S×β).

On the other hand, no reduction in contrast is seen with smaller S×β values, but because the optical sheet of the invention has a functional layer and therefore has a diffusion factor, the lower limit varies depending on the type of functional layer. In the optical sheet of the invention it is essential for S×β to be less than 0.70. An S×β value of less than 0.70 will result in a sufficient anti-glare property for the purpose of use, in the case of an anti-glare sheet, for example.

In order to ensure that 0.16<S×β<0.70 according to the invention, the diffusion luminance distribution and intensity may be adjusted by the internal diffusion factor and external diffusion factor.

The method for adjusting the reflective luminance distribution and intensity by the internal diffusion factor may be a method in which translucent inorganic particles and/or translucent organic particles (hereunder also referred to simply as "translucent particles") are dispersed in the resin composing the functional layer. It can also be accomplished by controlling the form of the transparent resin composing the functional layer and the translucent particles dispersed in the transparent resin, the state of dispersion, the particle size, the amount of addition and the refractive index. The concentrations of additives other than the translucent particles added to the transparent resin can also influence the diffuse reflection intensity by the internal diffusion factor.

As examples of methods for adjusting the diffuse reflection intensity by the external diffusion factor there may be mentioned:

(1) a method of using a die with fine irregularities in the surface and transferring the irregular shape to the optical sheet surface,
(2) a method of forming irregularities in the surface by cure shrinkage of the resin composing the functional layer, such as an ionizing radiation curable resin,
(3) a method of fixing the translucent fine particles as protrusions from the surface layer to form irregularities in the surface (either covering the protruding fine particles with the resin composing the surface layer, or causing the fine particles to protrude out), and
(4) a method of forming surface irregularities by external pressure.

As an example of method (1), an ionizing radiation curable resin may be mixed with the base material, and a die having fine irregularities may be bonded to the coating layer of the ionizing radiation curable resin for curing by ionizing radiation, to form an irregular shape on the surface of the optical sheet.

Method (2) can yield fine irregularities with a smooth surface and is therefore effective for glare prevention, while method (3) allows the performance to be adjusted by selection of the translucent particles and transparent resin, the coating film thickness, the solvent, the drying conditions and permeability into the base material, and is therefore a shorter process with simpler operation, which is thus effective for allowing low-cost production.

The functional layer provided between the irregular surface or irregular layer and the transparent base material, or an anti-reflection layer, antifouling layer, hard coat layer, antistatic layer or the like, will also influence the diffuse reflection intensity by the external diffusion factor. Specifically, by forming another functional layer on the irregular surface to create a two-layer structure, it is possible to moderate the surface irregularities and control the surface diffusion. Incidentally, by increasing the thickness of the coating film of the other functional layer, it is possible to moderate the surface irregularities, and control the surface diffusion by the coating solution composition and the coating and drying conditions as well.

Method (3) for obtaining the external diffusion factor is a suitable method from the viewpoint that it allows external diffusion and internal diffusion to be imparted simultaneously by the type of translucent fine particles used, thereby simplifying the production process.

On the other hand, using a method other than method (3) is preferred because it allows separate and independent design of a method for adjusting the diffuse reflection intensity by the external diffusion factors and a method of adjusting the diffuse reflection intensity by the internal diffusion factors, and this facilitates adjustment of the optical performance other than contrast, such as resolution, glare and anti-glare properties. Furthermore, this allows adjustment of the diffuse reflection intensity by the external diffusion factor, without considering the optical performance of the resin that is used, thus facilitating selection of a resin that exhibits physical performance including surface resin hard coat property, antifouling property and antistatic property.

[Translucent Particles]

The preferred range for translucent particles dispersed in a transparent resin will now be explained in detail.

The translucent particles may be organic particles or inorganic particles, and a mixture of organic particles and inorganic particles may also be used.

The mean particle size of the translucent particles used in the optical sheet of the invention is in the range of preferably 0.5-20 µm and more preferably 1-10 µm. Within this range it is possible to adjust the diffuse reflection intensity distribution by internal diffusion and/or external diffusion. In particular, if the mean particle size of the translucent particles is at least 0.5 μm the aggregation of particles will not be excessive and it will be easy to adjust formation of the irregularities, while if it is no greater than 20 μm, images with glare and shine will be prevented and a greater degree of design freedom will be ensured for the diffuse reflection intensity distribution.

Lower variation in the particle size of the translucent particles will also result in lower variation in the scattering property, thus facilitating design of the diffuse reflection intensity distribution. More specifically, (d75-d25)/MV is preferably no greater than 0.25 and more preferably no greater than 0.20, where MV is the mean diameter based on the weight average, d25 is the cumulative 25% diameter and d75 is the cumulative 75% diameter. The cumulative 25% diameter is the particle size constituting 25 wt %, counting from the particles with small particle size among the particle size distribution; and the cumulative 75% diameter is the particle size constituting 75 wt %, counting in the same manner.

As an example of adjusting the variation in particle size, the synthesis reaction conditions may be modified, while classification after synthesis reaction is also an effective means. With classification, the frequency may be increased or the degree intensified to obtain particles with the preferred distribution. The method used for classification is preferably an air classification method, centrifugal classification method, precipitating classification method, filtering classification method, electrostatic classification method or the like.

The difference in refractive index between the transparent resin composing the functional layer and the translucent particles is preferably 0.01-0.25. If the difference in refractive index is at least 0.01, it will be possible to prevent glare in the case of an anti-glare property sheet, for example, and if it is no greater than 0.25 the diffuse reflection intensity distribution design will be facilitated. From this viewpoint, the difference in refractive index is preferably 0.01-0.2 and more preferably 0.02-0.15. The refractive index of the translucent particles is measured by measuring the turbidity with dispersion of equal amounts of the translucent particles in solvents with varying refractive indexes, obtained by varying the mixing ratio with two different solvents having different refractive indexes, measuring the refractive index of the solvent at minimum turbidity using an Abbe refractometer.

The diffuse reflection intensity can also be modified by using two different types of translucent particles with a specific gravity difference of 0.1 or greater, by using two different types of translucent particles with different particle sizes and a particle size difference of 0.5 μm or greater, by using two different types of translucent particles with a difference in refractive index of 0.01 or greater, or by using spherical translucent particles and amorphous translucent particles together.

The specific gravity can be measured by liquid phase exchange or gas phase exchange (pycnometer method), the particle size can be measured by the Coulter counter method or optical diffraction scattering method, or by observing the optical laminate cross-section with a microscope such as an SEM or TEM, and the refractive index can be measured by direct measurement with an Abbe refractometer, or by quantitative evaluation by measurement of the spectral reflection spectrum or spectroscopic ellipsometry.

As translucent organic particles there may be used polymethyl methacrylate particles, polyacryl-styrene copolymer particles, melamine resin particles, polycarbonate particles, polystyrene particles, crosslinked polystyrene particles, polyvinyl chloride particles, benzoguanamine-melamine-formaldehyde particles, silicone particles, fluorine-based resin particles, a polyester-based resin, or the like.

As translucent inorganic particles there may be mentioned silica particles, alumina particles, zirconia particles, titania particles or hollow or porous inorganic particles.

Since even translucent fine particles having the same refractive index and particle size distribution will have a different diffuse reflection intensity distribution depending on the degree of aggregation of the translucent particles, the diffuse reflection intensity distribution can be modified by combining two or more translucent particles with different aggregation states, or using two or more types of inorganic particles with different silane coupling treatment conditions to alter the aggregation state.

In order to prevent aggregation of the translucent particles, it is preferred to employ a method of adding silica with a particle size of no greater than the wavelength of visible light rays, such as a particle size of no greater than about 50 nm.

To obtain an internal diffusion effect, it is effective to use amorphous translucent particles of silica with a particle size of greater than the wavelength of visible light rays. Amorphous particles have an effect of widening the distribution of the transmission diffusion angle compared to spherical particles. However, since amorphous translucent particles also widen the internal reflective distribution, they can affect the coating film diffusibility and interfere with adjustment of the diffuse reflection intensity, and therefore they are preferably added as necessary, such as when a wide transmission diffusion is desired. More specifically, amorphous translucent particles are preferably added in a range of less than 4 wt % with respect to the total of the spherical particles and amorphous translucent particles.

The translucent particles are preferably added at 1-30 wt % and more preferably 2-25 wt % in the transparent resin (solid content). At 1 wt % or greater it will be possible to produce sufficient anti-glare properties or light diffusion, and to obtain satisfactory visibility, while reduction in contrast is avoided at up to 30 wt %.

[Transparent Resin]

The transparent resin used to form the functional layer may be an ionizing radiation curable resin or thermosetting resin. For formation of the functional layer, a resin composition comprising the ionizing radiation curable resin or thermosetting resin may be coated onto a base material, and the monomer, oligomer and prepolymer in the resin composition may be crosslinked and/or polymerized.

The functional groups of the monomer, oligomer and prepolymer are preferably ionizing radiation-polymerizable, and are especially photopolymerizable functional groups.

As photopolymerizable functional groups there may be mentioned unsaturated polymerizable functional groups such as (meth)acryloyl, vinyl, styryl and allyl.

As prepolymers and oligomers there may be mentioned acrylates such as urethane (meth)acrylates, polyester (meth) acrylates and epoxy (meth)acrylates, silicon resins such as siloxane, and unsaturated polyesters, epoxy resins and the like.

As monomers there may be mentioned styrene-based monomers such as styrene and α-methylstyrene; acrylic monomers such as methyl (meth)acrylate, 2-ethylhexyl (meth)acrylate, pentaerythritol (meth)acrylate, dipentaerythritol hexa(meth)acrylate, dipentaerythritol penta(meth)acrylate and trimethylolpropane tri(meth)acrylate; and polyol compounds having two or more thiol groups in the molecule, such as trimethylolpropane trithioglycolate, trimethylolpropane trithiopropylate and pentaerythritoltetrathioglycol.

As binders there may be used polymers added to the resin composition. Polymethyl methacrylate (PMMA) is an example of such a polymer. Addition of a polymer allows the viscosity of the coating solution to be adjusted, and this is advantageous in that it can facilitate coating while also facilitating modification of the irregular shape formed by particle aggregation.

A photoradical polymerization initiator may also be added to the resin composition if necessary. As photoradical polymerization initiators there may be used acetophenones, benzoins, benzophenones, phosphine oxides, ketals, anthraquinones, thioxanthones, azo compounds and the like.

As acetophenones there may be mentioned 2,2-dimethoxyacetophenone, 2,2-diethoxyacetophenone, p-dimethylacetophenone, 1-hydroxy-dimethyl phenyl ketone, 1-hydroxy-dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-t-butyl-dichloroacetophenone, and as benzoins there may be mentioned benzoin, benzoinmethyl ether, benzoinethyl ether, benzoinisopropyl ether, benzyldimethylketal, benzoinbenzenesulfonic acid ester, benzointoluenesulfonic acid ester, benzoinmethyl ether, benzoinethyl ether and the like. As benzophenones there may be used benzophenone, hydroxybenzophenone, 4-benzoyl-4-2-methyldiphenyl sulfide, 2,4-dichlorobenzophenone, 4,4-dichlorobenzophenone and p-chlorobenzophenone, 4,4'-dimethylaminobenzophenone (Michler's ketone), 3,3',4,4'-tetra(t-butylperoxycarbonyl)benzophenone, and the like.

A photosensitizer may also be used therewith in combination, specific examples of which include n-butylamine, triethylamine and poly-n-butylphosphine.

Using a plurality of phase separable resins as the transparent resin will also allow adjustment of the diffuse reflection intensity by the internal diffusion factor. That is, by using a compatible component and a non-compatible component in admixture for the prepolymer, oligomer, monomer and polymer, it is possible to adjust the diffuse reflection intensity by the internal diffusion factor. For example, when one resin is a styrene-based resin (polystyrene, styrene-acrylonitrile copolymer or the like), the other resin is preferably a cellulose derivative (cellulose ester such as cellulose acetate propionate or the like), a (meth)acrylic-based resin (polymethyl methacrylate or the like), an alicyclic olefin-based resin (a polymer with norbornane as the monomer, or the like), a polycarbonate-based resin or a polyester-based resin. When one resin is a cellulose derivative (a cellulose ester such as cellulose acetate propionate or the like), the other resin is preferably a styrene-based resin (polystyrene, styrene-acrylonitrile copolymer or the like), a (meth)acrylic-based resin (polymethyl methacrylate or the like), an alicyclic olefin-based resin (a polymer with norbornane as the monomer, or the like), a polycarbonate-based resin or a polyester-based resin.

The ratio of the combined resins (weight ratio) can be selected within the range of 1/99-99/1, preferably the range of 5/95-95/5, more preferably the range of 10/90-90/10, even more preferably the range of 20/80-80/20, and especially the range of 30/70-70/30.

In addition, using a prepolymer, oligomer or monomer with large polymerization shrinkage will allow adjustment of the diffuse reflection intensity by the external diffusion factor. A larger polymerization shrinkage increases the surface irregularities, thus widening the diffuse reflection intensity distribution.

A solvent will usually be added to the radiation-curing resin composition to adjust the viscosity or to allow dissolution or dispersion of each of the components. The type of solvent used will alter the surface condition of the coating film in the coating and drying steps, and it is therefore selected as appropriate in consideration of allowing adjustment of the reflection intensity distribution by external diffusion. Specifically, it is selected in consideration of the saturation vapor pressure and permeability into the base material.

The resin composition used to form the functional layer composing the optical sheet of the invention preferably contains an ionizing radiation-curable resin as the transparent resin, translucent particles, and a solvent. The resin composition preferably contains a solvent that is to be impregnated into the base material (hereinafter also referred to as "permeable solvent"), and/or an ionizing radiation curable resin that is to be impregnated into the base material, and a solvent that is not to be impregnated into the base material and/or an ionizing radiation curable resin that is not to be impregnated into the base material. By adjusting the amount of impregnation into the base material it is possible to control the thickness of the functional layer, and thus allow modification of the diffuse reflection intensity.

More particularly, the diffuse reflection intensity can be controlled by the amount of impregnation into the base material and the sizes of the translucent particles. Specifically, when the amount of impregnation of the solvent and/or ionizing radiation curable resin (hereinafter also referred to simply as "solvent mixture") into the base material is low and the translucent particle sizes are small, a functional layer is formed with the majority of the particles embedded in the solvent mixture, but since the translucent particles tend to aggregate, the surface irregularities are relatively large. On the other hand, when using a combination of a solvent mixture with a large amount of impregnation into the base material and translucent particles with small particle sizes, aggregation of the translucent particles is reduced and the surface irregularities are relatively small.

When using a combination of a solvent and/or ionizing radiation curable resin with a large amount of impregnation into the base material and translucent particles with large particle sizes, the thickness of the functional layer is reduced, resulting in protrusion of the translucent particles out from the functional layer, forming surface irregularities due to the translucent particles. In contrast, when using a combination of a solvent mixture with a small amount of impregnation into the base material and translucent particles with large particle sizes, the thickness of the functional layer is increased, thus inhibiting protrusion of the translucent particles into the surface and resulting in relatively small surface irregularities.

By thus adjusting the amount of impregnation of the solvent and/or ionizing radiation curable resin into the base material and effecting control by combination with different particle sizes of translucent particles, it is possible to form surface irregularity shapes of various sizes.

This method is particularly effective when the base material is a cellulose-based resin.

Furthermore, a single type of solvent may be used, or two or more different solvents with different boiling points and/or relative evaporation rates at ordinary temperature/ordinary pressure may be included. By using two or more different solvents, it is possible to achieve a wide range of control of the solvent drying speed. A high drying speed results in volatilization, and thus less solvent and higher viscosity, before aggregation of the particles has occurred, such that no further aggregation takes place. Thus, control of the drying speed accomplishes control of the translucent particle sizes, and as explained above, it is linked with control of the diffuse reflection intensity by the relationship with the degree of penetration of the solvent and/or ionizing radiation curable resin into the base material. The relative evaporation rate is the speed calculated by the following formula according to ASTM-D3539, with a larger value representing faster evaporation. Relative evaporation rate=time required for evaporation of n-butyl acetate/time required for evaporation of solvent.

The specific solvent may be appropriately selected in consideration of the aforementioned explanation, and specifically there may be mentioned aromatic solvents such as toluene and xylene, and ketones such as methyl ethyl ketone (MEK), methyl isobutyl ketone (MIBK) and cyclohexanone. Any of these may be used alone or in combinations of two or more. It is preferred to use a mixture of at least one type of aromatic solvent and at least one type of ketone. To control the drying speed, there may be combined therewith a cellosolve such as methylcellosolve or ethylcellosolve, a cellosolve acetate, or an alcohol such as ethanol, isopropanol, butanol or cyclohexanol.

Additives other than translucent particles may also be added to the transparent resin in the optical sheet of the invention, as necessary. For example, various inorganic particles may be added to improve the optical characteristics, including the physical properties such as hardness, and the reflectance and scattering property.

As inorganic particles there may be mentioned metals such as zirconium, titanium, aluminum, indium, zinc, tin and antimony, and metal oxides such as $ZrO_2$, $TiO_2$, $Al_2O_3$, $In_2O_3$, ZnO, $SnO_2$, $Sb_2O_3$, ITO, ATO or $SiO_2$. Also included are carbon, MgF, silicon, $BaSO_4$, $CaCO_3$, talc, kaolin and the like.

The particle sizes of the inorganic particles are preferably as micronized as possible in the resin composition during coating of the functional layer, in order to minimize the effect on the diffuse reflection intensity distribution, and the mean particle size is preferably in a range of no greater than 100 nm. By micronizing the inorganic particles to no greater than 100 nm, it is possible to form an optical sheet that does not impair the transparency. The particle sizes of the inorganic particles can be measured by the light scattering method or using an electron microscope photograph.

According to the invention, various surfactants may be used for an anti-aggregation effect and anti-settling effect, as well as to improve the properties such as the leveling property. As surfactants there may be mentioned silicone oils, fluorine-based surfactants, and fluorine-based surfactants preferably containing perfluoroalkyl groups.

According to the invention there may also be added stain-proofing agents, antistatic agents, coloring agents (pigments and dyes), flame retardants, ultraviolet absorbers, infrared absorbers, tackifiers, polymerization inhibitors, antioxidants, surface modifiers and the like.

The base material used in the optical sheet of the invention is not particularly restricted so long as it is commonly used in optical sheets, and it may be a transparent resin film, transparent resin plate, transparent resin sheet, transparent glass or the like.

As transparent resin films there may be used triacetylcellulose films (TAC films), diacetylcellulose films, acetylbutylcellulose films, acetylpropylcellulose films, cyclic polyolefin films, polyethylene terephthalate films, polyethersulfone films, polyacrylic-based resin films, polyurethane-based resin films, polyester films, polycarbonate films, polysulfone films, polyether films, polymethylpentene films, polyetherketone films, (meth)acrylonitrile films, polynorbornane-based resin films and the like. In particular, a TAC film or cyclic polyolefin film is preferred when the optical sheet of the invention is to be used together with a polarizing plate, since these do not interfere with polarized light, and a polyester film such as a polyethylene terephthalate film is preferred if emphasis is on mechanical strength and smoothness.

The base material may be a multilayer or monolayer material, and a primer layer may also be provided on the surface for adhesion with the coating film. In order to prevent interference patterns produced at the interface when a substantial difference in refractive index exists between the base material and coating film layer, an anti-interference pattern layer with a refractive index intermediate between the base material and coating film layer may be provided between them, or irregularities of about 0.3-1.5 μm may be formed as surface roughness (ten-point height of irregularities: Rz). The Rz value is Measured according to JIS B0601 1994.

Functions such as a hard coat property, anti-glare property, anti-reflection property, antistatic property or antifouling property may be imparted to the optical sheet of the invention.

The hard coat property is usually evaluated based on the pencil hardness (measured according to JIS K5400), or by a 10-pass abrasion test using steel wool #0000 under a load, evaluating the maximum load under which no damage is observed with black tape attached to the back side (steel wool scuff resistance). The pencil hardness of the optical sheet of the invention is preferably H or greater, and more preferably 2H or greater. The steel wool scuff resistance is preferably 200 g/cm$^2$ or greater, more preferably 500 g/cm$^2$ or greater and even more preferably 700 g/cm$^2$ or greater.

For the anti-glare property, preferably translucent particles that can impart an anti-glare property and a solvent are added to a transparent resin that can impart a hard coat property, and surface irregularities are formed by protrusions of the translucent particles themselves or protrusions formed by aggregates of multiple particles. The anti-glare property can be evaluated by the following method.
(Method of Evaluating Anti-Glare Property)

A measuring sample is fabricated by attaching an optical sheet to a flat black acrylic board. A light source is directed from a direction 15° with respect to the direction normal to the measuring sample, the reflected image from the light source is photographed with a CCD camera set at a location in the mirror surface direction, and the maximum peak intensity of reflected light is determined. The measurement is conducted using two light sources of different sizes, and the anti-glare property is evaluated by the following formula (IV), where PL is the reflected light peak intensity value as measured with the large light source, and PS is the reflected light peak intensity value as measured with the small light source.

$$50 \times \log (PL/PS) \qquad (IV)$$

A larger numerical value represents a higher anti-glare property. The value for this evaluation is preferably 20 or greater, more preferably 40 or greater and even more preferably 60 or greater.

Also, a measuring sample may be fabricated by attaching an optical sheet to a flat black acrylic board, a light source of about 900 lux projected at an angle of about 15°, for example, and visual evaluation made of the degree of halation seen from the regular reflection direction.

For an anti-reflection property, a low refractive index layer is provided on the outer surface to reduce the reflectance of the sheet. The refractive index of the low refractive index layer is preferably no greater than 1.5 and more preferably no greater than 1.45.

The low refractive index layer is formed of a material containing silica or magnesium fluoride, or a fluorine resin as a low refractive index resin.

The thickness d of the low refractive index layer preferably satisfies $d=m\lambda/4n$. Here, m represents a positive odd number, n represents the refractive index of the low refractive index layer, and $\lambda$ represents the wavelength. The value of m is preferably 1, and $\lambda$ is preferably 480-580 nm. From the viewpoint of low reflectance, the relationship $120<n\cdot d<145$ is preferably satisfied.

Antistatic performance is preferably imparted from the viewpoint of preventing static electricity on the optical sheet surface. To impart antistatic performance, there may be mentioned methods known in the prior art, such as a method of coating a conductive coating solution comprising conductive fine particles, a conductive polymer, a quaternary ammonium salt, thiophene or the like and a reactive curing resin, or a method of forming a conductive thin-film by vapor deposition or sputtering of a metal or metal oxide that forms a transparent film. The antistatic layer may also be used as a portion of a functional layer, such as for hard coating, anti-glare, anti-reflection or the like.

The surface resistance value is an index of the antistatic property, and according to the invention the surface resistance value is preferably no greater than $10^{12}\Omega/sq.$, more preferably no greater than $10^{11}\Omega/sq.$ and especially no greater than $10^{10}\Omega/sq.$ The "saturated electrostatic voltage", or the maximum voltage at which the optical film can accumulate, is preferably no greater than 2 kV at an applied voltage of 10 kV.

An antifouling layer may also be provided on the outer surface of the optical sheet of the invention. An antifouling layer lowers the surface energy and inhibits adhesion of hydrophilic or lipophilic contaminants. The antifouling layer can be imparted by adding a stain-proofing agent, and as stain-proofing agents there may be mentioned fluorine-based compounds, silicon-based compounds and their mixtures, among which fluoroalkyl group-containing compounds are particularly preferred.

A method for producing an optical sheet of the invention will now be explained in detail. According to the invention, it is essential to control the production conditions so that the formula $0.16<S\times\beta<0.70$ as an index is satisfied, as mentioned above.

The optical sheet of the invention is produced by coating a resin composition that is to form the functional layer on a base material. The coating method may be any of various known methods, such as dip coating, air knife coating, curtain coating, roll coating, wire bar coating, gravure coating, die coating, blade coating, microgravure coating, spray coating or spin coating, for example.

According to the invention, the reflection diffusion luminance property changes by the coating amount, and therefore roll coating, gravure coating or die coating is preferred since they allow a functional layer thickness to be stably obtained in the range of 1-20 μm.

After coating by any of the aforementioned methods, the sheet is transported into a heated zone to dry the solvent, or another known method is used to dry the solvent. By selecting the relative evaporation rate of the solvent, the solid concentration, the coating solution temperature, the drying temperature, the drying air speed, the drying time and the dry zone solvent atmosphere concentration, it is possible to adjust the external diffusion due to the profile of the surface irregularity shapes, and the internal diffusion due to the translucent particles or additives. A method of adjusting the reflection diffusion luminance property by selection of the drying conditions is particularly preferred and convenient. Specifically, the drying temperature is preferably 30-120° C. and the drying wind speed 0.2-50 m/s, as the reflection diffusion luminance property can be controlled with appropriate adjustment in this range.

More specifically, increasing the drying temperature increases the permeability of the resin and solvent into the base material. That is, by controlling the drying temperature it is possible to control the permeability of the resin and solvent into the base material, and as explained above, this is linked with control of the diffuse reflection intensity by the relationship between the translucent particles and particle sizes.

For example, when the resin composition used to form the functional layer comprises a transparent resin, translucent particles and a solvent, the refractive index of the permeable component in the transparent resin is lower than the refractive index of the translucent particles and the leveling property and settling and aggregation of the translucent particles are on the same level, a longer drying time until curing results in permeation of the low refraction components in the transparent resin into the base material, a higher refractive index of the transparent resin, and a lower difference in refractive index with the translucent particles. On the other hand, since the proportion of the translucent particles with respect to the transparent resin increases, the translucent particles tend to protrude out from the surface, so that surface irregularities readily form. Thus, a longer drying time reduces the internal diffusion while simultaneously increasing the external diffusion. Incidentally, this permeability can be utilized for adhesiveness between the base material and functional layer by an anchor effect, or to prevent generation of interference patterns that become notable when the difference in refractive index between the base material and functional layer is 0.03 or greater. This permeation layer that is produced by permeation of the low refraction component in the transparent resin into the base material exhibits a function as a refractive index-modifying layer wherein the refractive index between the base material and functional layer varies continuously, and acts to eliminate the interface.

Also, by increasing the drying speed, the aggregation time of the translucent particles is shortened so that aggregation is impeded, thus exhibiting the same effect as an actual reduction in the particle size of the translucent particles. That is, by controlling the drying speed it is possible to control the sizes of the translucent particles that are used, and as explained above, this is linked with control of the diffuse reflection intensity by the relationship with the degree of penetration of the solvent and/or ionizing radiation curable resin into the base material.

EXAMPLES

The present invention will now be explained in greater detail by examples, with the understanding that the invention'is in no way limited by the examples.
(Evaluation Method)
1. Calculation of S For the optical sheets fabricated in each of the production examples, the diffuse reflection intensity was measured using a GC5000L by Nippon Denshoku Industries Co., Ltd., by the method described in the present specification, and S was calculated. The diffuse reflection intensity was measured in a range of −85° to 85° with respect to the direction normal to the surface of the optical sheet.
2. Calculation of β

For the optical sheets fabricated in each of the production examples, the diffuse reflection intensity was measured using a GC5000L by Nippon Denshoku Industries Co., Ltd., by the method described in the present specification, and β was calculated. The diffuse reflection intensity was measured in a range of −85° to 85°.

3. Measurement of Haze

For the optical sheets fabricated in each of the production examples, measurement was conducted with an HM-150 Hazemeter by Murakami Color Research Laboratory Co., Ltd.

4. Anti-Glare Property

For the optical sheets fabricated in each of the production examples, a measuring sample was fabricated by attaching the optical sheet to a flat black acrylic board, a light source of about 900 lux was projected at an angle of about 15°, for example, and the degree of halation seen from the regular reflection direction was visually evaluated. An evaluation of 1 represents the poorest anti-glare property, and an evaluation of 5 represents a satisfactory anti-glare property.

5. Measurement of Contrast (Light-Room Contrast)

The light-room contrast is represented by the following formula.

$$CR(L)=LW(L)/LB(L)$$

(CR(L): Light-room contrast, LW(L): Light-room white luminance, LB(L): Light-room black luminance)

Since in general the change in light-room white luminance is small and the change in light-room black luminance is large, the light-room contrast is governed by the light-room black luminance. Also, since the original black luminance of the panel is smaller than the light room black luminance and can be ignored, the blackness (black luminance) in the following regions was evaluated to evaluate the actual light-room contrast. For the optical sheets fabricated in each of the production examples, the back side (the side without the surface layer, or the side opposite the observer side) is attached via a transparent pressure-sensitive adhesive to a flat black acrylic board without irregularities or warping, to fabricate an evaluation sample. The black acrylic board used here is to prevent back side reflection as described above, and it is not particularly restricted so long as no air layer is present on the back side of the optical sheet, and visible light can be absorbed. The sample was placed on the horizontal plane and subjected to organoleptic evaluation (visual observation from an angle of about 45° with respect to the vertical axis on the side opposite the fluorescent lamp, at 50 cm above the sample surface) under 30 W three band fluorescence (irradiation from a direction 45 degrees to the surface of the optical sheet), to evaluate the blackness on a 5-level scale. An evaluation of 1 indicates poorest blackness and lowest contrast, and an evaluation of 5 indicates most satisfactory blackness and highest contrast.

Production Example 1

Triacetylcellulose (80 μm thickness, FujiFilm Corp.) was prepared as a base material. The transparent resin used was a mixture of pentaerythritol triacrylate
(PETA), dipentaerythritol hexaacrylate (DPHA) and polymethyl methacrylate (PMMA) (weight ratio: PETA/DPHA/PMMA=86/5/9) (refractive index: 1.51), and polystyrene particles (refractive index: 1.60, mean particle size: 3.5 μm, (d75-d25)/MV=0.05) and styrene-acrylic copolymer particles (refractive index: 1.56, mean particle size: 3.5 μm, (d75-d25)/MV=0.04) were added thereto as translucent particles, at 18.5 and 3.5 parts by weight, respectively, with respect to 100 parts by weight of the transparent resin. A resin composition, obtained by mixing a mixed solvent of toluene (boiling point: 110° C., relative evaporation rate: 2.0) and cyclohexanone (boiling point: 156° C., relative evaporation rate: 0.32) (weight ratio: 7:3) as the solvent at 190 parts by weight with respect to 100 parts by weight of the transparent resin, was coated onto the base material and dry air at 70° C. was circulated at a flow rate of 0.2 m/s for 1 minute of drying. Next, it was irradiated with ultraviolet rays (200 mJ/cm² under a nitrogen atmosphere) to cure the transparent resin, to fabricate an optical sheet (anti-glare sheet). The coating film thickness was 3.5 μm. The results of evaluating the optical sheet by the methods described above are shown in Table 2.

Production Examples 2-7 and Production Examples 9-17

An optical sheet (anti-glare sheet) was fabricated for Production Example 1, changing the type of base material, the type of transparent resin, the types and content of translucent particles, the type and content of the solvent, the drying conditions and the coating film thickness, as listed in Table 1. The results of evaluating each optical sheet in the same manner as Production Example 1 are shown in Table 2.

Production Example 8

Triacetylcellulose (80 μm thickness, FujiFilm Corp.) was prepared as a base material. Pentaerythritol triacrylate (PETA, refractive index: 1.51) was used as the transparent resin, and there were added thereto as translucent particles, styrene-acrylic copolymer particles (refractive index: 1.51, mean particle size: 9.0 μm, (d75-d25)/MV=0.04) and polystyrene particles (refractive index: 1.60, mean particle size: 3.5 μm, (d75-d25)/MV=0.05), at 10.0 parts by weight and 6.5 parts by weight, respectively, with respect to 100 parts by weight of the transparent resin. A resin composition obtained by mixing a mixed solvent of toluene (boiling point: 110° C., relative evaporation rate: 2.0) and cyclohexanone (boiling point: 156° C., relative evaporation rate: 0.32) (weight ratio: 7:3) as the solvent at 190 parts by weight with respect to 100 parts by weight of the transparent resin, was coated onto the base material and dry air at 85° C. was circulated at a flow rate of 1 m/s for 1 minute of drying. This was irradiated with ultraviolet rays (100 mJ/cm² under an air atmosphere) to cure the transparent resin (form an anti-glare layer).

A resin composition obtained by mixing PETA (pentaerythritol triacrylate, refractive index: 1.51) as the transparent resin and a mixed solvent of toluene (boiling point: 110° C., relative evaporation rate: 2.0) and cyclohexanone (boiling point: 156° C., relative evaporation rate: 0.32) (weight ratio: 7:3) as the solvent at 190 parts by weight with respect to 100 parts by weight of the transparent resin, was coated onto the coating film layer (anti-glare layer), and dry air at 70° C. was circulated at a flow rate of 5 m/s for 1 minute of drying (hard coat layer formation). This was irradiated with ultraviolet rays (200 mJ/cm² under a nitrogen atmosphere) to cure the transparent resin, to fabricate an optical sheet (an anti-glare sheet with a hard coat layer). The total coating film thickness was 13.0 μm. The results of evaluating this optical sheet in the same manner as Production Example 1 are shown in Table 2.

Production Example 9

An optical sheet (anti-glare sheet with a hard coat layer) was fabricated for Production Example 8 in the same manner as Production Example 8, except that the content of the polystyrene particles as the translucent particles was 6.5 parts by weight with respect to 100 parts by weight of the transparent resin, and the total coating film thickness was 13.0 μm. The results of evaluation in the same manner as Production Example 1 are shown in Table 2.

light-room contrasts of the optical sheets of the examples were satisfactory, while low values were exhibited for light-room contrast by the optical sheets with S×β values of less

TABLE 1

| Prod. Ex. | Transparent base material Type | Transparent resin Type | Translucent particles Type | | Content | Solvent Type | Content | Drying conditions Temp. (° C.) | Wind Speed (m/s) | Time (min) | Film thickness (μm) |
|---|---|---|---|---|---|---|---|---|---|---|---|
| 1 | TAC | P | A | B | 18.5  3.5 | Y | 190 | 70 | 0.2 | 1 | 3.5 |
| 2 | TAC | P | A | — | 16  — | Y | 190 | 70 | 1 | 1 | 3.5 |
| 3 | TAC | P | B | — | 9  — | Y | 190 | 70 | 2 | 1 | 5.5 |
| 4 | TAC | Q | C | — | 12  — | Y | 150 | 80 | 15 | 0.5 | 8.5 |
| 5 | TAC | Q | E | — | 8  — | X | 190 | 70 | 10 | 0.5 | 2.0 |
| 6 | TAC | P | A | — | 16  — | Y | 190 | 55 | 1 | 1 | 3.5 |
| 7 | TAC | P | A | B | 16.5  2 | Y | 190 | 55 | 5 | 1 | 4.0 |
| 8 | TAC | Q/Q | C | A | 10  6.5 | Y/Y | 190/190 | 85/70 | 1/5 | 1/1 | 13.0 |
| 9 | TAC | Q | E | D | 1  5 | X | 190 | 60 | 10 | 0.5 | 2.5 |
| 10 | TAC | P | A | — | 16  — | Y | 190 | 70 | 0.5 | 1 | 3.0 |
| 11 | TAC | P | A | B | 12.5  2 | Y | 150 | 100 | 25 | 0.5 | 4.0 |
| 12 | TAC | Q | E | D | 4  4 | X | 190 | 70 | 10 | 0.5 | 2.0 |
| 13 | TAC | Q | E | — | 9  — | X | 190 | 70 | 10 | 0.5 | 2.0 |
| 14 | TAC | Q | D | E | 3.5  0.5 | X | 150 | 80 | 20 | 0.5 | 2.5 |
| 15 | TAC | Q | E | — | 2  — | X | 150 | 80 | 20 | 0.5 | 4.0 |
| 16 | PET | Q | D | — | 1  — | X | 190 | 70 | 5 | 1 | 4.5 |
| 17 | PET | Q | E | — | 3  — | X | 150 | 50 | 50 | 0.5 | 5.0 |

A: Polystyrene particles (refractive index: 1.60, mean particle size: 3.5 μm, (d75 − d25)/MV = 0.05)
B: Styrene-acrylic copolymer particles (refractive index: 1.56, mean particle size: 3.5 μm, (d75 − d25)/MV = 0.04)
C: Styrene-acrylic copolymer particles (refractive index: 1.51, mean particle size: 9.0 μm, (d75 − d25)/MV = 0.04)
D: Amorphous silica (refractive index: 1.45, mean particle size: 1.5 μm, (d75 − d25)/MV = 0.6)
E: Amorphous silica (refractive index: 1.45, mean particle size: 2.5 μm, (d75 − d25)/MV = 0.8)
P: Mixture of pentaerythritol triacrylate (PETA), dipentaerythritol hexaacrylate (DPHA) and polymethyl methacrylate (PMMA) (weight ratio: PETA/DPHA/PMMA = 86/5/9) (refractive index: 1.51)
Q: Pentaerythritol triacrylate (PETA) (refractive index: 1.51)
X: Mixture of toluene (boiling point: 110° C., relative evaporation rate: 2.0) and methyl isobutyl ketone (boiling point: 116° C., relative evaporation rate: 1.6) (weight ratio: 8:2)
Y: Mixture of toluene (boiling point: 110° C., relative evaporation rate: 2.0) and cyclohexanone (boiling point: 156° C., relative evaporation rate: 0.32) (weight ratio: 7:3)

TABLE 2

| Prod. Ex. | S | β | S × β | Total haze (%) | Interior haze (%) | Interior haze/Total haze (%) | Light-room contrast | Anti-glare property |
|---|---|---|---|---|---|---|---|---|
| 1 | 0.0540 | 2.910 | 0.157 | 40.6 | 29.2 | 71.9 | 1 | 5 |
| 2 | 0.0515 | 2.884 | 0.149 | 38.5 | 27.7 | 71.9 | 1 | 5 |
| 3 | 0.1806 | 1.954 | 0.353 | 10.5 | 7.9 | 75.2 | 3 | 2 |
| 4 | 0.0820 | 2.817 | 0.231 | 2.5 | 1.6 | 64.0 | 2 | 4 |
| 5 | 0.0129 | 5.900 | 0.076 | 23.5 | 1.9 | 8.1 | 1 | 5 |
| 6 | 0.0283 | 4.680 | 0.132 | 41.0 | 29.7 | 72.4 | 1 | 5 |
| 7 | 0.0291 | 4.572 | 0.133 | 44.6 | 32.7 | 73.3 | 1 | 5 |
| 8 | 0.4280 | 1.340 | 0.574 | 17.4 | 16.9 | 97.1 | 5 | 2 |
| 9 | 0.1821 | 1.641 | 0.299 | 2.2 | 1.3 | 59.1 | 3 | 3 |
| 10 | 0.0856 | 2.497 | 0.214 | 37.9 | 28.1 | 74.1 | 2 | 4 |
| 11 | 0.0481 | 2.813 | 0.135 | 42.0 | 34.4 | 81.9 | 1 | 5 |
| 12 | 0.0349 | 3.549 | 0.124 | 10.3 | 2.1 | 20.4 | 1 | 5 |
| 13 | 0.0125 | 6.146 | 0.077 | 23.0 | 2.8 | 12.2 | 1 | 5 |
| 14 | 0.1074 | 1.946 | 0.209 | 3.6 | 2.8 | 77.8 | 2 | 4 |
| 15 | 0.0702 | 2.542 | 0.179 | 5.6 | 4.8 | 85.7 | 2 | 4 |
| 16 | 0.5940 | 1.183 | 0.703 | 1.3 | 0.0 | 0.0 | 5 | 1 |
| 17 | 0.1822 | 1.662 | 0.303 | 3.4 | 3.1 | 91.2 | 3 | 2 |

Figure 5:
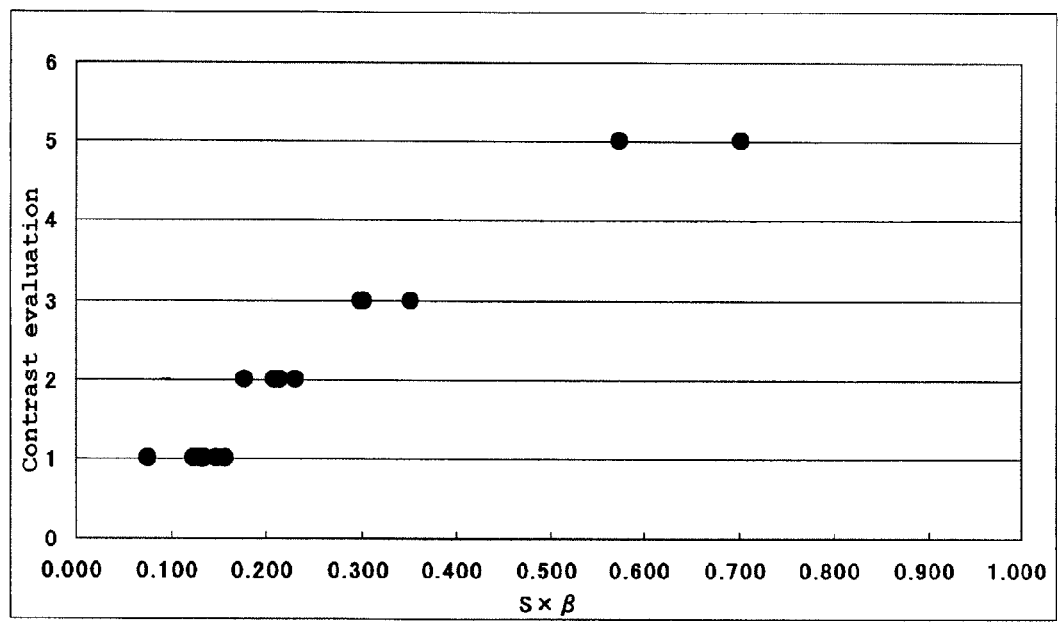
FIG. 5 is a graph showing the correlation between $S \times \beta$ and contrast.
Figure 6:
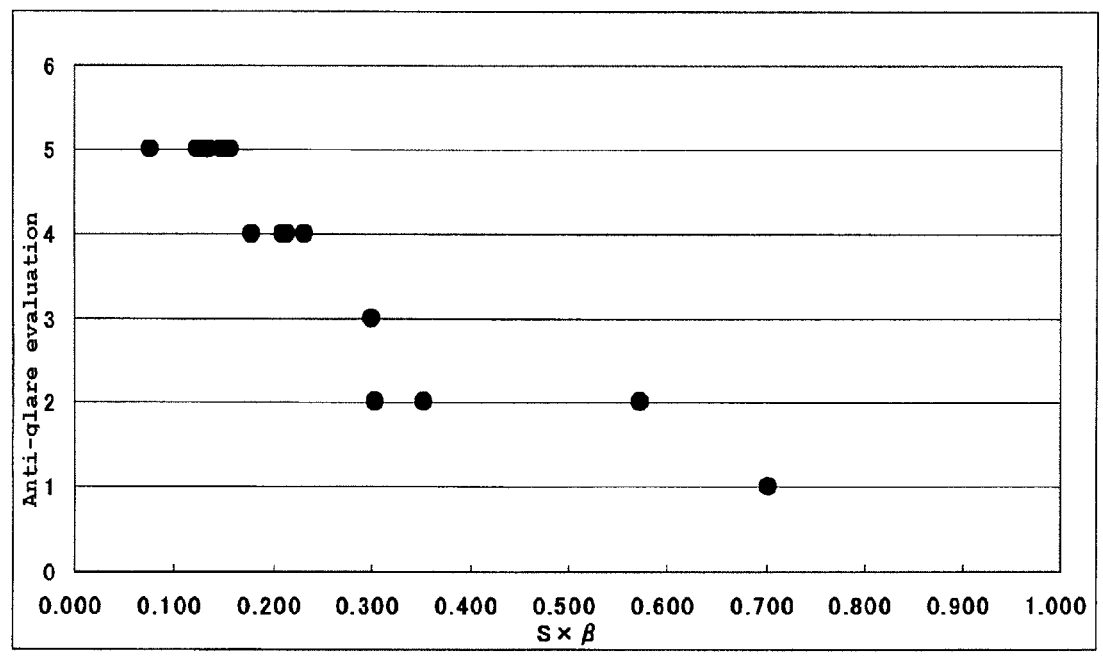
FIG. 6 is a graph showing the correlation between $S \times \beta$ and anti-glare property.

For Production Examples 1-17, S×β was calculated from the results of measuring the diffuse reflection intensity, and the results of plotting S×β on the abscissa and contrast and anti-glare property on the ordinate are shown in FIG. 5 and FIG. 6, respectively. A correlation was exhibited between S×β and contrast and anti-glare property. According to the invention, Production Examples 3, 4, 8-10, 14, 15 and 17 correspond to examples that satisfy 0.16<S×β<0.70, and Production Examples 1, 2, 5-7, 11-13 and 16 correspond to comparative examples that do not satisfy the formula. The light-room contrasts of the optical sheets of the examples were satisfactory, while low values were exhibited for light-room contrast by the optical sheets with S×β values of less than 0.16. On the other hand, the optical sheets with S×β values of 0.70 or greater had insufficient anti-glare properties.

Figure 1:
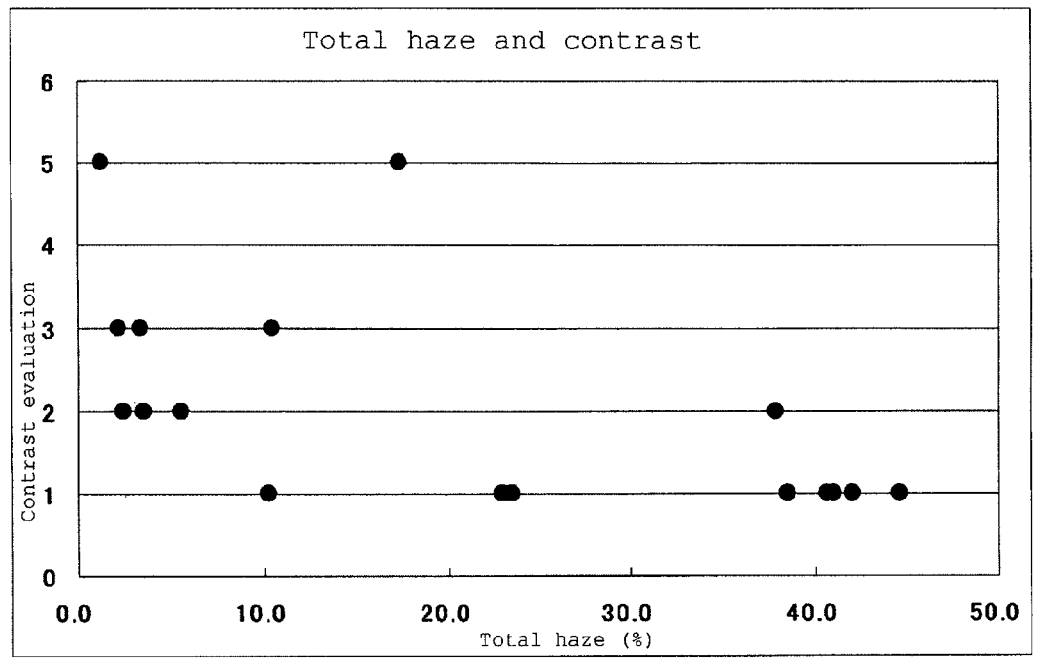
FIG. 1 is a graph showing the relationship between haze value and contrast.
Figure 2:
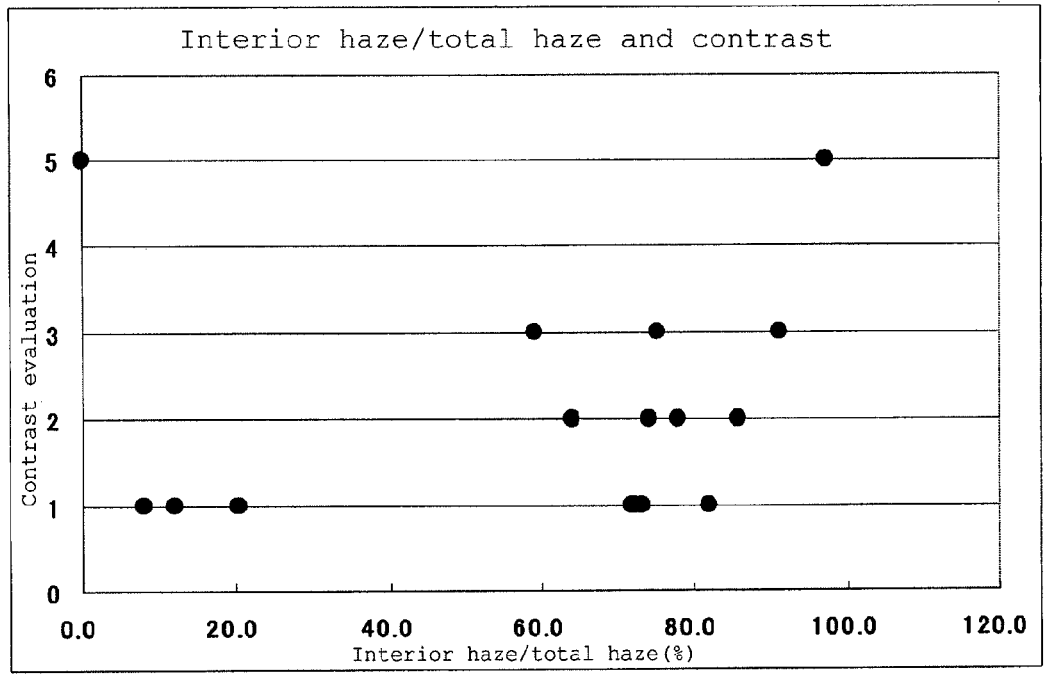
FIG. 2 is a graph showing the relationship between interior haze/total haze ratio and contrast.
Figure 7:
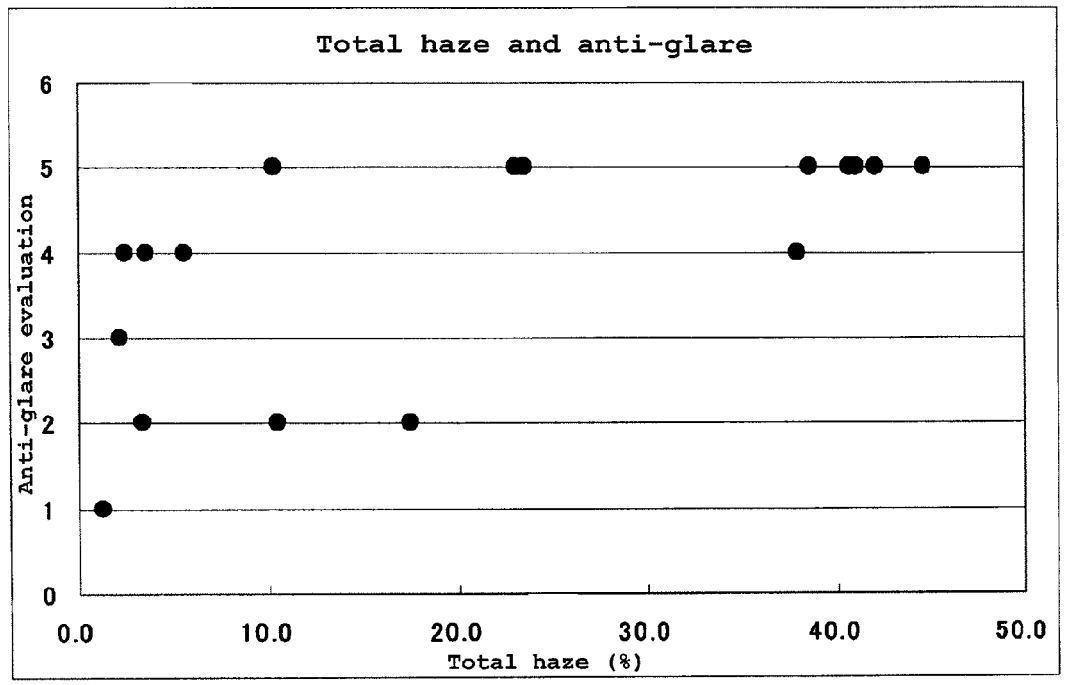
FIG. 7 is a graph showing the relationship between haze value and anti-glare property.
Figure 8:
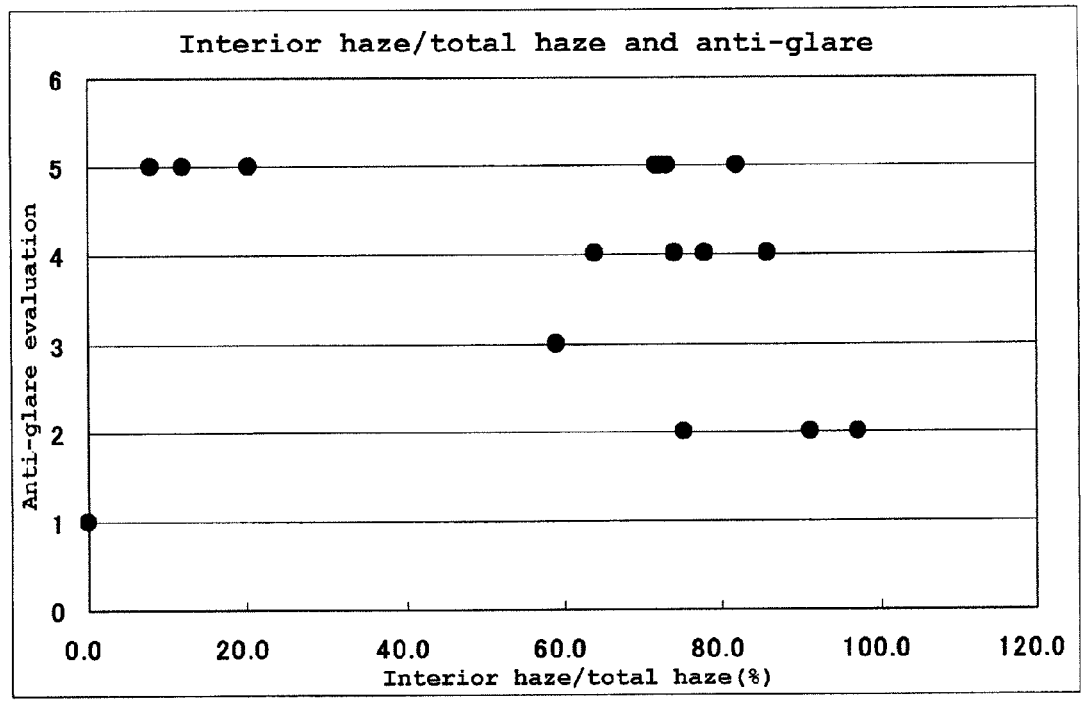
FIG. 8 is a graph showing the correlation between interior haze/total haze ratio and anti-glare property.
Figures 1, 9:
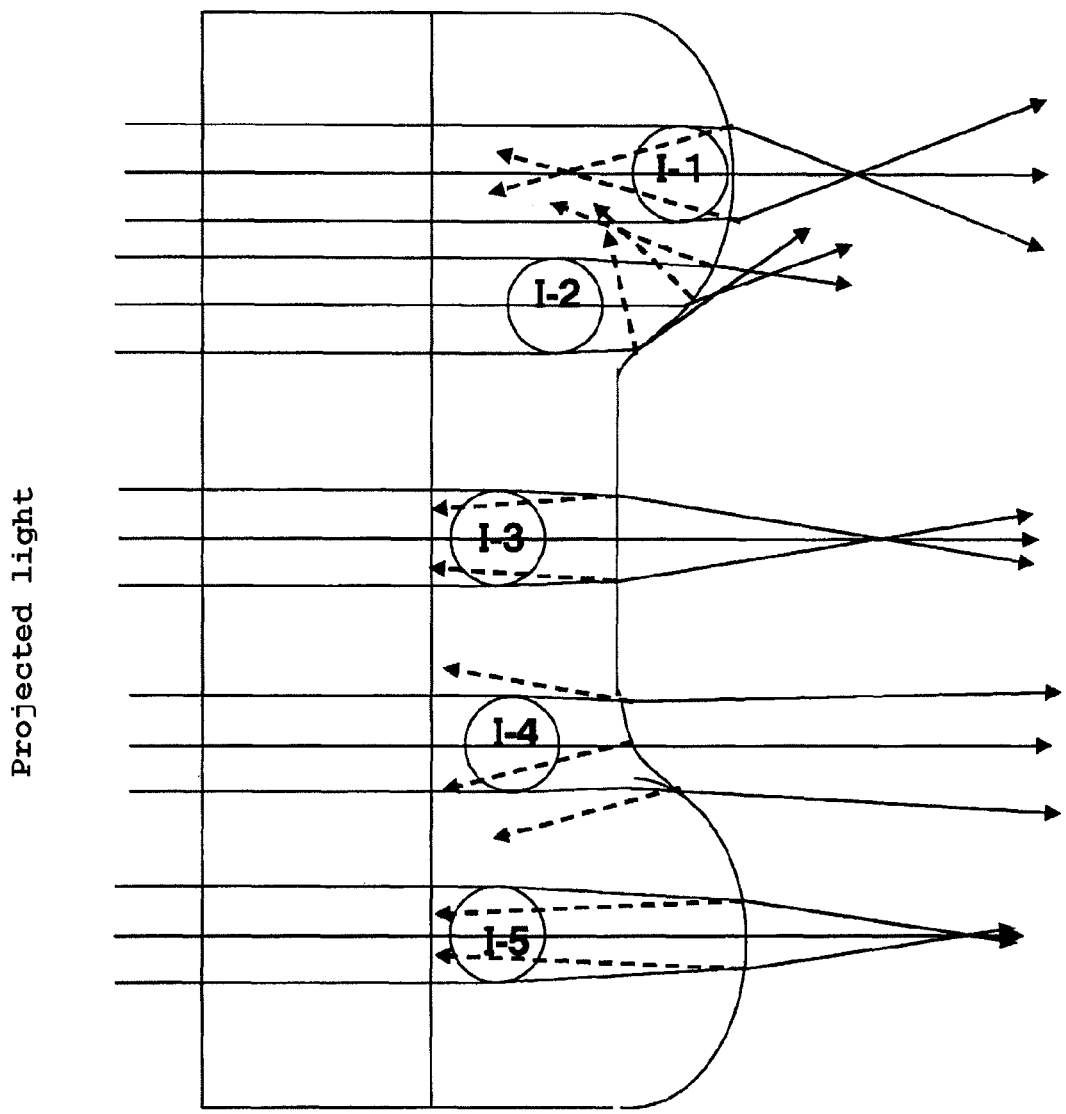
FIG. 9 is a set of diagrams illustrating the properties of reflected light based on the positional relationship of diffusion particles and surface irregularities for projected light and external light.
Figures 2, 9:
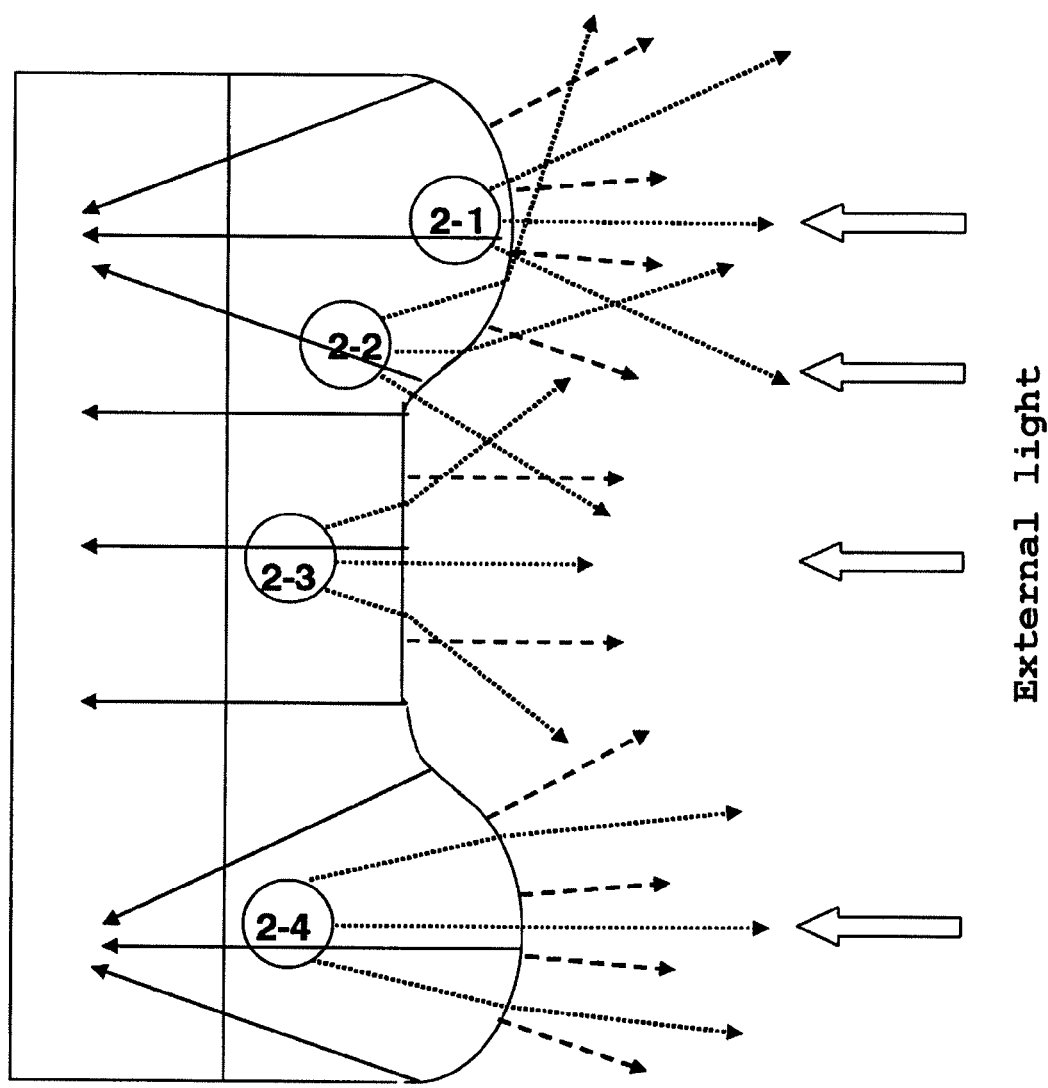
Figures 1, 10:
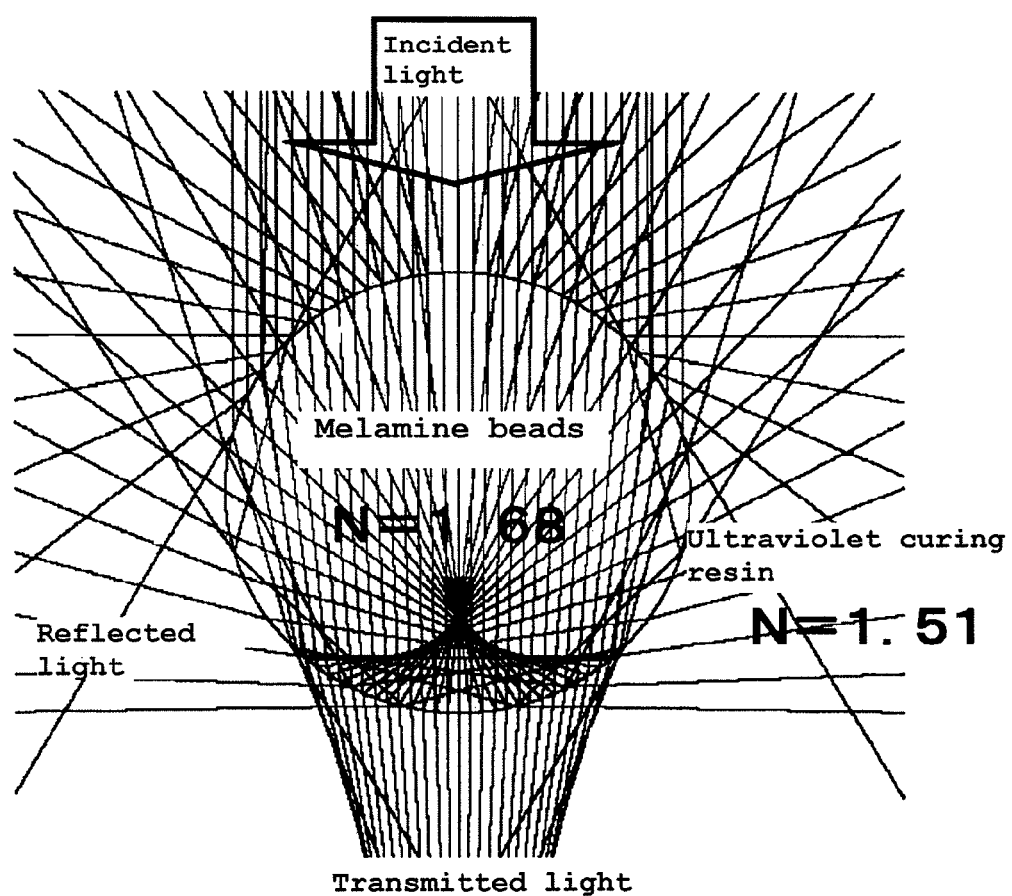
FIG. 10 is a set of diagrams illustrating differences in diffusion properties of light based on the difference in refractive indexes of interior diffusion particles and binder resin.
Figures 2, 10:
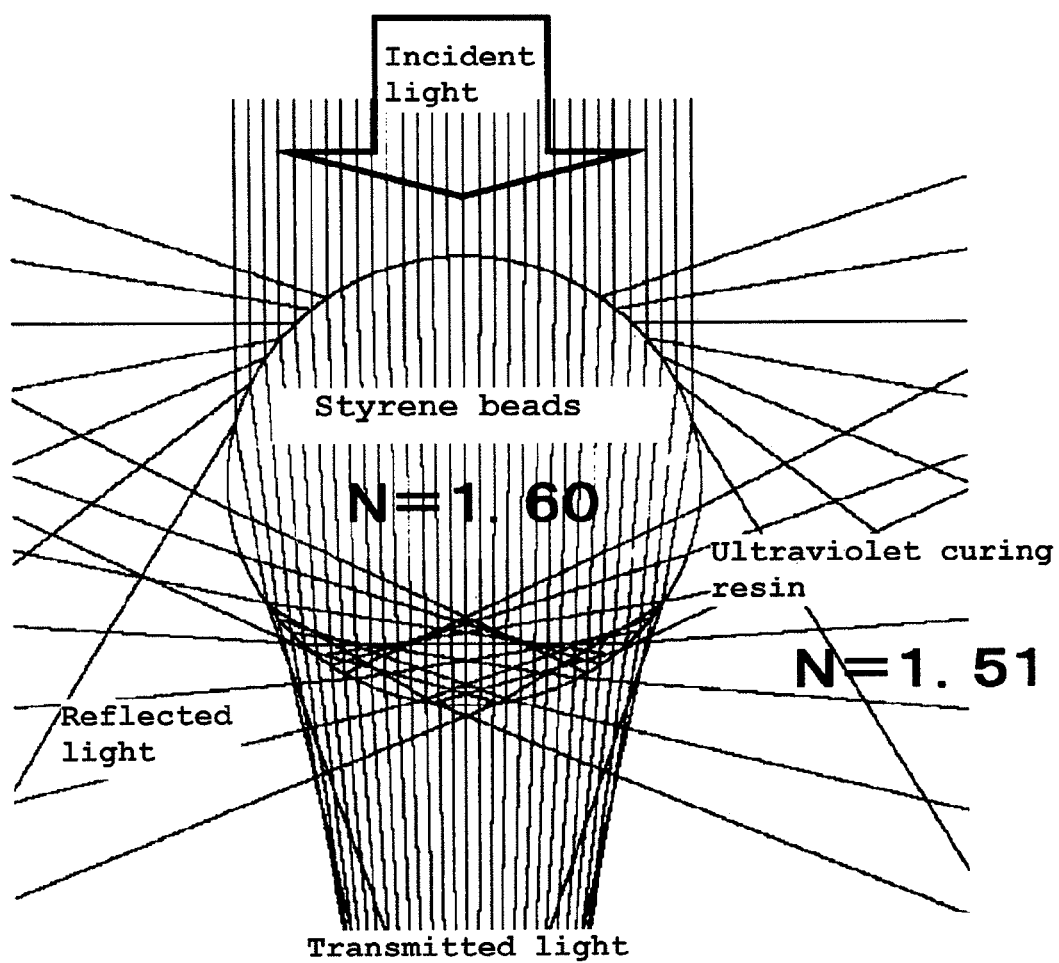
Figures 3, 10:
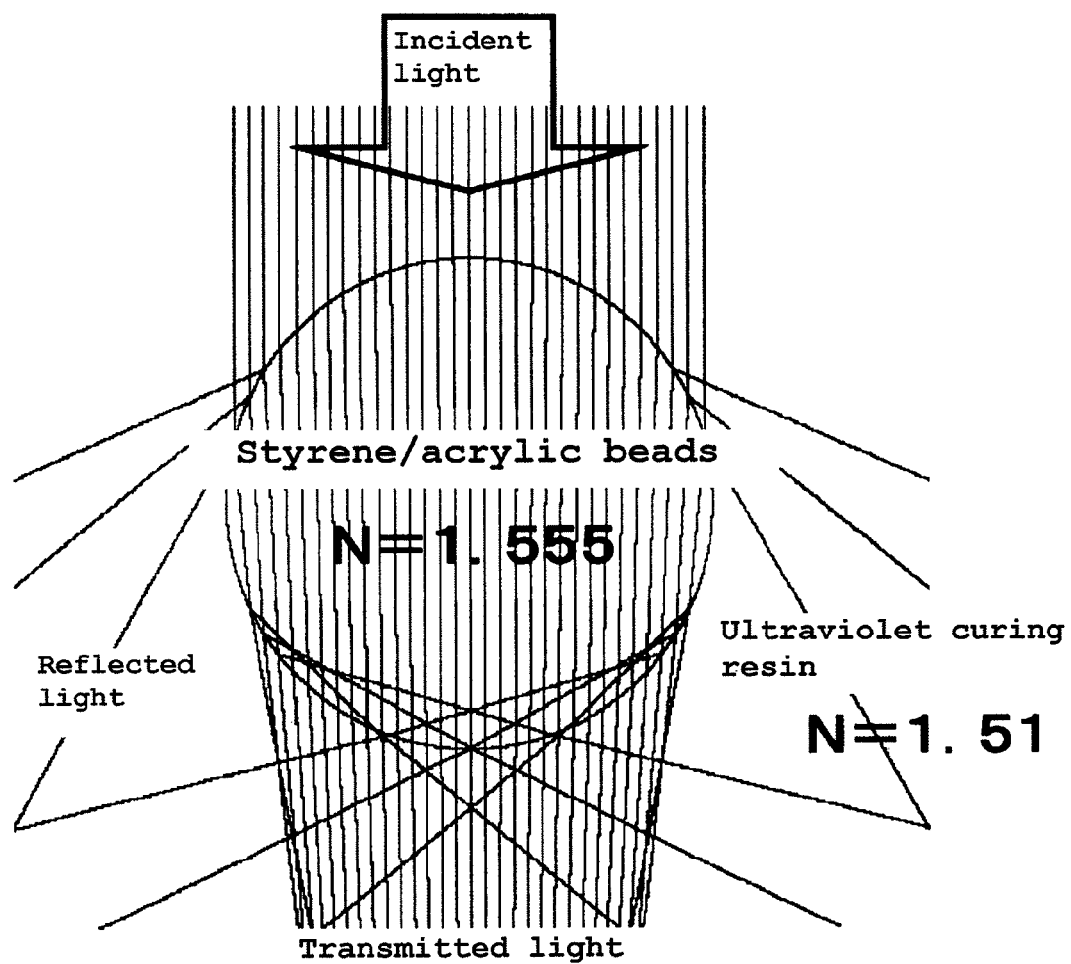
Figures 4, 10:
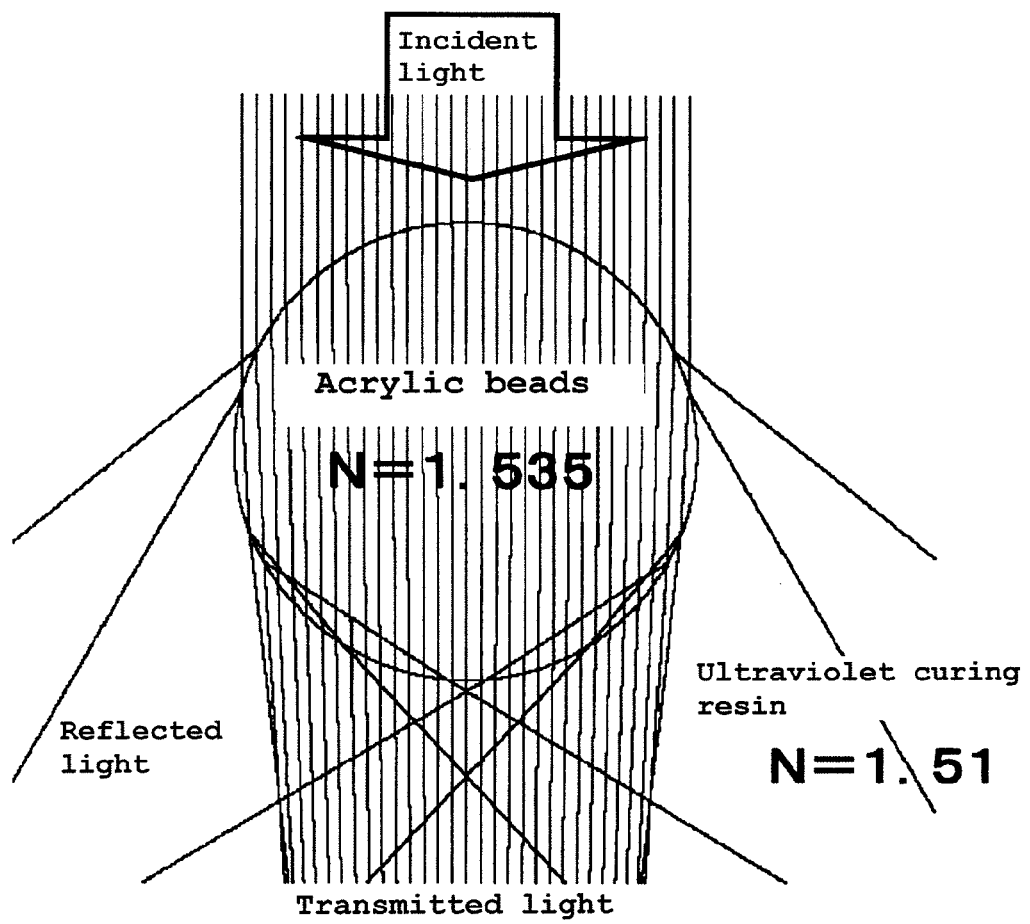

FIG. 1 shows the results of plotting haze on the abscissa and contrast on the ordinate, based on the results of measuring the haze values for Production Examples 1-17. Also, FIG. 7 shows the results of plotting haze on the abscissa and anti-glare property on the ordinate. In addition, FIG. 2 shows the results of plotting the ratio between interior haze and total haze on the abscissa and contrast on the ordinate, while FIG. 8 shows the results of plotting the ratio between interior haze and total haze on the abscissa and anti-glare property on the ordinate. No correlation was found between haze and contrast and anti-glare property, or between interior haze/total haze ratio and contrast and anti-glare property.

The optical sheet of the invention has low reduction in contrast and a satisfactory anti-glare property.

The invention claimed is:

1. An optical sheet having anti-glare properties for use as a display device surface, the optical sheet comprising:
    a base material; and
    a functional layer having an outer surface and an interior, the functional layer being formed by curing an ionizing radiation curable resin on at least one side of the base material, and having a diffusion factor on at least one of the outer surface and the interior of the functional layer, wherein the relationship represented by the following formula (I) is satisfied, $$0.16 < S \times \beta < 0.70 \qquad (I)$$

S: Diffuse regular reflection intensity/regular reflection intensity of base material β: The diffusion angle exhibiting ⅓ of the diffusion intensity, obtained by extrapolating a straight line connecting the reflection intensity for diffuse regular reflection intensity at ±2 degrees and the reflection intensity for diffuse regular reflection at ±1 degree or the reflection intensity for diffuse regular reflection intensity at −2 degrees and the reflection intensity for diffuse regular reflection at −1 degree, to the diffuse regular reflection angle.

2. An optical sheet according to claim 1, wherein the relationship represented by the following formula (II) is satisfied;

$$0.26 < S \times \beta < 0.70 \quad \text{(II)}.$$

3. An optical sheet according to claim 1, wherein the relationship represented by the following formula (III) is satisfied;

$$0.46 < S \times \beta < 0.70 \quad \text{(III)}.$$

4. An optical sheet according to claim 1, wherein the display device is a liquid crystal display unit.

5. An optical sheet according to claim 4, wherein the functional layer comprises at least one of translucent inorganic particles and translucent organic particles dispersed in the ionizing radiation curable resin, and irregularities disposed on at least one of the outer surface and an inner surface of the functional layer by the at least one of the translucent inorganic particles and the translucent organic particles.

6. An optical sheet according to claim 4, wherein the base material is a transparent base material comprising a cellulose-based resin, the functional layer is formed by coating an ionizing radiation curable resin composition comprising the ionizing radiation curable resin on the transparent base material and subjecting the ionizing radiation curable resin to crosslinking curing, the ionizing radiation curable resin composition comprises at least one of a solvent impregnated into the transparent base material and an ionizing radiation curable resin impregnated into the transparent base material, and at least one of a solvent not impregnated into the transparent base material and an ionizing radiation curable resin not impregnated into the transparent base material, and the degree of impregnation into the transparent base material is adjusted for control so that the relationship of formula (I), formula (II) or formula (III) is satisfied.

7. An optical sheet according to claim 4, wherein the base material is a transparent base material that is triacetylcellulose or a cyclic polyolefin.

8. An optical sheet according to claim 4, wherein the base material is a transparent base material that is polyethylene terephthalate.

9. An optical sheet according to claim 4, wherein the functional layer comprises a hard coat layer, and the steel wool scuff resistance is at least 200 g/cm$^2$.

10. An optical sheet according to claim 4, further comprising an anti-reflection functional layer formed on an uppermost surface layer.

11. A polarizing plate employing an optical sheet according to claim 1.

12. An image display device employing a polarizing plate according to claim 11.

13. An optical sheet according to claim 1, further comprising a visible light ray-absorbing material attached to a back side of the base material.

14. An optical sheet according to claim 13, wherein the visible light ray-absorbing material is attached to the back side of the base material via an adhesive.

15. An optical sheet according to claim 13, wherein the visible light ray-absorbing material is a black acrylic board.

16. An optical sheet according to claim 1, wherein the at least one of translucent inorganic particles and translucent organic particles dispersed in the ionizing radiation curable are configured and arranged so as to produce anti-glare properties.

* * * * *